US007997352B2

(12) United States Patent
Hashimoto et al.

(10) Patent No.: US 7,997,352 B2
(45) Date of Patent: Aug. 16, 2011

(54) ELECTRIC POWER TOOL

(75) Inventors: Koichi Hashimoto, Hikone (JP); Kazuto Toyama, Hikone (JP); Kazuhiko Nishii, Omihachiman (JP); Tatsuya Miwa, Maibara (JP); Takechika Ishibashi, Moriyama (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 211 days.

(21) Appl. No.: 12/385,031

(22) Filed: Mar. 30, 2009

(65) Prior Publication Data

US 2009/0242227 A1 Oct. 1, 2009

(30) Foreign Application Priority Data

Mar. 31, 2008 (JP) ................................. 2008-093597

(51) Int. Cl.
*B23B 45/021* (2006.01)

(52) U.S. Cl. ....................................... 173/171; 173/170

(58) Field of Classification Search .............. 173/2, 170, 173/171, 176; 320/114
See application file for complete search history.

(56) References Cited

U.S. PATENT DOCUMENTS

| | | | | |
|---|---|---|---|---|
| 6,357,534 | B1 | 3/2002 | Buetow et al. | |
| 2002/0100597 | A1 | 8/2002 | Numata | |
| 2003/0201738 | A1 | 10/2003 | Yamamoto | |
| 2004/0108020 | A1 * | 6/2004 | Dierickx et al. | 148/547 |
| 2006/0001404 | A1 * | 1/2006 | Ziegler et al. | 320/150 |
| 2006/0087283 | A1 | 4/2006 | Phillips et al. | |
| 2006/0268504 | A1 * | 11/2006 | Shimizu et al. | 361/683 |

FOREIGN PATENT DOCUMENTS

| | | |
|---|---|---|
| EP | 0 899 063 | 3/1999 |
| EP | 1 726 410 | 11/2006 |
| GB | 2 418 057 | 3/2006 |

* cited by examiner

*Primary Examiner* — Sameh H. Tawfik
*Assistant Examiner* — Nathaniel Chukwurah
(74) *Attorney, Agent, or Firm* — Bacon & Thomas, PLLC

(57) ABSTRACT

An electric power tool includes a tool body and a battery pack removably mounted to the tool body. The battery pack is used as a power source of the tool body. The electric power tool further includes a lock unit for keeping the battery pack mounted to the tool body and an interrupter switch for interrupting the operation of the tool body when the lock unit does not keep the battery pack mounted to the tool body. Accordingly, the electric power tool is not operable when the battery pack is not completely mounted to the tool body.

8 Claims, 8 Drawing Sheets

ELECTRIC POWER TOOL

FIELD OF THE INVENTION

The present invention relates to an electric power tool and, more particularly, to an electric power tool including a tool body and a battery pack as a power source removably mounted to the tool body.

BACKGROUND OF THE INVENTION

In an electric power tool including a removably mounted battery pack as its power source, a lock unit for keeping the battery pack mounted to a tool body is provided so that the integrity of electric connection between the tool body and the battery pack should not be impaired by the vibration generated when performing a work with the electric power tool. In order to avoid generation of looseness between the tool body and the battery pack as far as possible, the lock unit is configured not to come into a connection-keeping state (namely, a locked state) unless the battery pack is completely mounted to the tool body (see, e.g., Japanese Patent Laid-open Publication No. 2001-143678).

The battery pack and the tool body are connected to each other through a current supplying terminal portion which is designed to have a specified over-travel amount for enhancement of its reliability.

For that reason, it is often the case that an electric current is supplied from the battery pack to the tool body even when the battery pack is not completely mounted to the tool body and the lock unit is not in the locked state. If a user unknowingly operates a switch of the tool body in this state, there may occur a situation that the electric power tool comes to be normally operated. In this case, the battery pack may possibly be dropped from the tool body if the user continues to use the electric power tool in that state.

SUMMARY OF THE INVENTION

In view of the above, the present invention provides an electric power tool that can be kept inoperable when a battery pack is not completely mounted to a tool body and can avoid impairing the integrity of electric connection between the battery pack and the tool body.

In accordance with an aspect of the invention, there is provided an electric power tool including: a tool body;

a battery pack removably mounted to the tool body, the battery pack being used as a power source of the tool body; a lock unit for keeping the battery pack mounted to the tool body; and an interrupter switch for interrupting the operation of the tool body when the lock unit does not keep the battery pack mounted to the tool body.

With the present invention, the operation of the tool body is interrupted by the interrupter switch when the lock unit does not keep the battery pack mounted to the tool body. This eliminates the possibility to perform a work in a state that the battery pack is incompletely mounted to the tool body. Therefore, it is possible to prevent the battery pack from inadvertently dropping from the tool body. Furthermore, there is no likelihood of marring the integrity of electric connection between the battery pack and the tool body.

It is preferable that the electric power tool has the interrupter switch which is turned on and off in response to the operation of the lock unit.

Preferably, the electric power tool has the lock unit which includes a push button portion for operating the interrupter switch, the push button portion being made of an elastic material.

Since the interrupter switch is turned on and off in response to the operation of the lock unit, it is possible to easily and accurately turn on and off the interrupter switch depending on whether the battery pack is kept mounted to the tool body or not. This makes it possible to more reliably provide the effect of preventing the inadvertent dropping of the battery pack. In this regard, since the lock unit includes a push button portion for operating the interrupter switch and the push button portion is made of an elastic material, it is possible for the push button portion to absorb the positional deviation between the push button portion and the interrupter switch in the stroke direction of the lock unit. This enhances the reliability in the operation of the interrupter switch.

Preferably, the electric power tool has the interrupter switch which is arranged to have a stroke direction perpendicular to the operating direction of the lock unit.

Since the interrupter switch is arranged to have a stroke direction perpendicular to the operating direction of the lock unit, it is possible to secure the over-travel amount of the interrupter switch regardless of the positional deviation between the lock unit and the interrupter switch in the stroke direction. This enhances the reliability in the operation of the interrupter switch.

Preferably, the electric power tool has the interrupter switch which is designed for use in turning on and off a circuit control signal.

Since the interrupter switch is designed for use in turning on and off a circuit control signal, there is no need to interrupt the flow of a large current. This makes it possible to use a small and cheap interrupter switch. Therefore, the interrupter switch becomes cost-effective and enjoys enhanced reliability.

Preferably, the electric power tool has the interrupter switch which is configured to be turned off when the lock unit keeps the battery pack mounted to the tool body.

Since the interrupter switch is configured to be turned off when the lock unit keeps the battery pack mounted to the tool body, there is no possibility that the contact points of the interrupter switch are adversely affected by the vibration generated when the electric power tool is used after complete mounting of the battery pack. This makes it possible to enhance the reliability of the interrupter switch.

Preferably, the electric power tool has the lock unit and the interrupter switch which are provided in the battery pack.

Since the lock unit and the interrupter switch are provided in the battery pack, the battery pack itself can provide enhanced safety. Therefore, when the battery pack is commonly used in different tool bodies, it is always possible to obtain desirable results without having to change the design of the tool bodies.

BRIEF DESCRIPTION OF THE DRAWINGS

The objects and features of the present invention will become apparent from the following description of embodiments, given in conjunction with the accompanying drawings, in which.

DETAILED DESCRIPTION OF THE PREFERRED EMBODIMENTS

Figure 2:
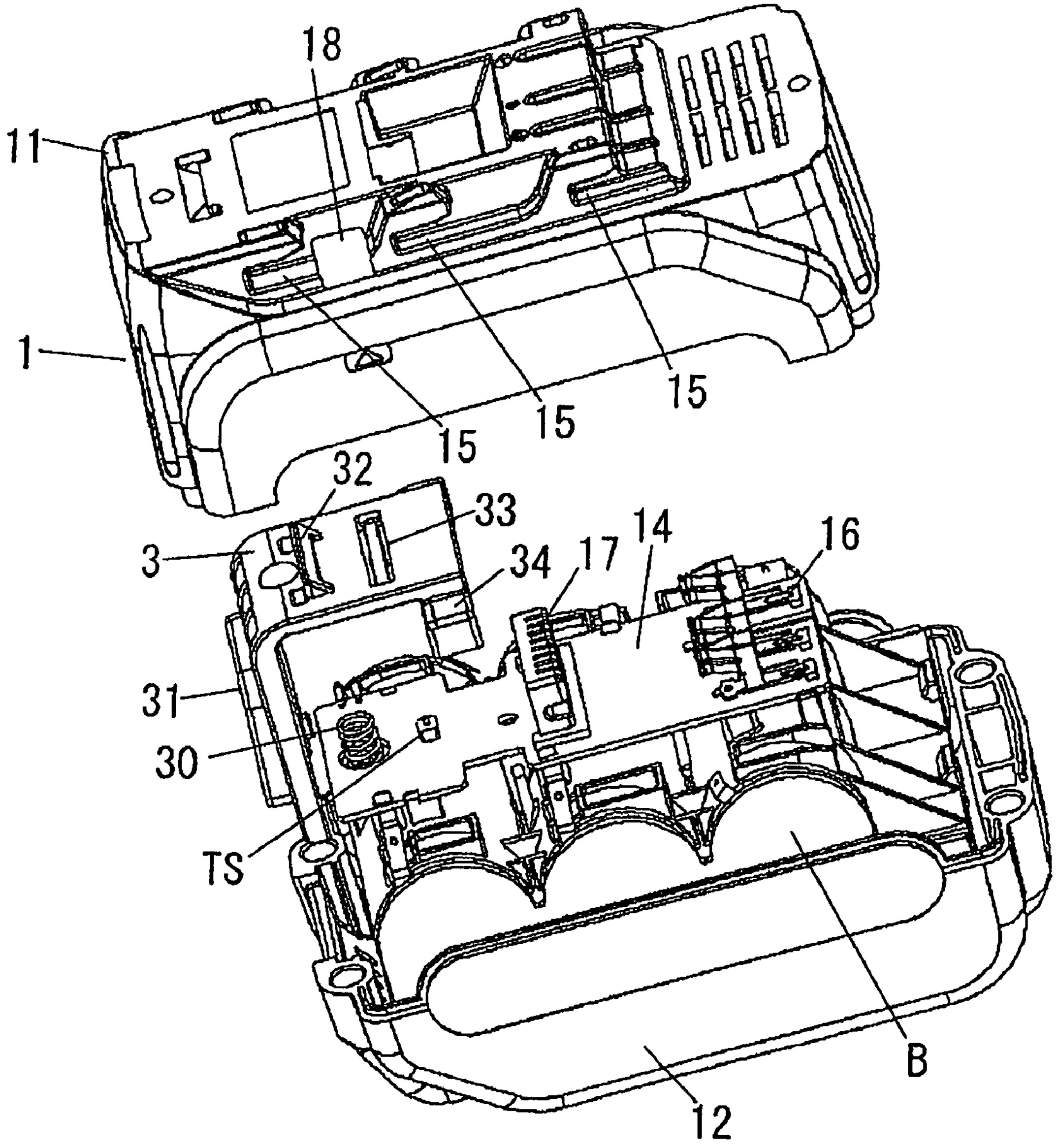
FIG. 2 is an exploded perspective view showing a battery pack employed in the electric power tool.

Hereinafter, embodiments of the present invention will be described with reference to the accompanying drawings which form a part hereof. FIGS. 2 and 3 show a battery pack 1 employed in an electric power tool of the present invention. The battery pack 1 includes upper and lower housings 11 and 12. Battery cells B, a circuit board 14 and a lock plate 3 are arranged within the housings 11 and 12. The upper housing 11 has a plurality of generally L-shaped engagement grooves 15 formed on the upper opposite side surfaces thereof along a back-and-forth direction.

Figure 9:
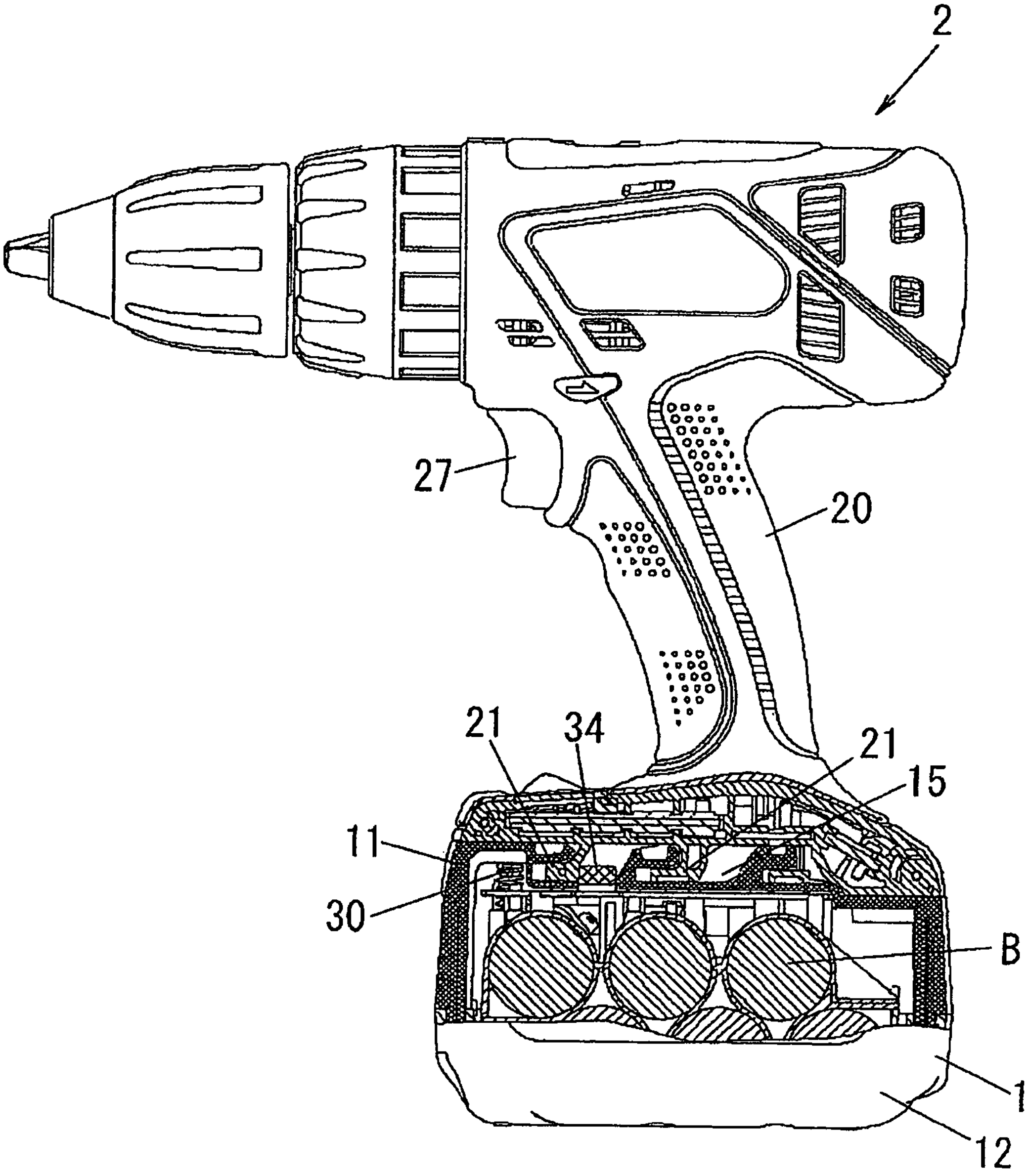
FIG. 9 is a partially cut-away side view showing the tool body and the battery pack coupled together.

The engagement grooves 15 are used in connecting the battery pack 1 to a tool body 2 of the electric power tool. As can be seen in FIG. 9, the tool body 2 includes a grip portion 20 having a plurality of connection protrusions 21 formed at the lower opposite sides thereof. As the battery pack 1 is pressed against the tool body 2, the connection protrusions 21 are inserted into the transverse introduction groove portions of the engagement grooves 15. Thereafter, if the battery pack 1 is slid backwards relative to the tool body 2, the connection protrusions 21 enter the longitudinal groove portions of the engagement grooves 15. Consequently, the battery pack 1 is coupled to the tool body 2.

The circuit board 14 includes a power source terminal group 16 and a signal line terminal group 17, which face the upper surface of the upper housing 11. The terminal groups 16 and 17 are connected to the corresponding terminal groups of the tool body 2 when the connection protrusions 21 enter the longitudinal groove portions of the engagement grooves 15.

The lock plate 3, which constitutes a lock unit in the present invention, is vertically movably arranged within the battery pack 1 and is biased upwards by a return spring 30. The lock plate 3 includes an operation portion 31 exposed at the front side of the battery pack 1, a projection portion 32 protruding toward the upper surface of the battery pack 1 and a pair of lock pins 34.

Figure 3A:
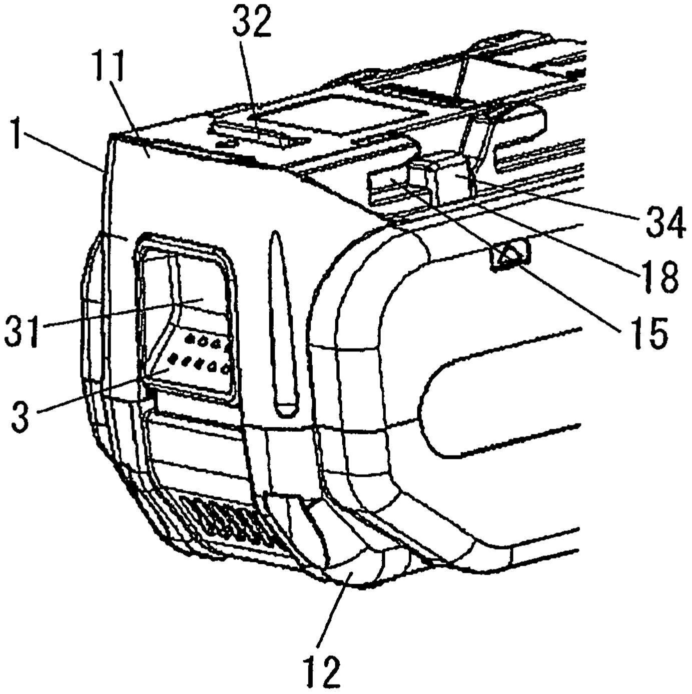
FIGS. 3A and 3B are perspective views illustrating the operation of a lock plate of the battery pack.
Figure 3B:
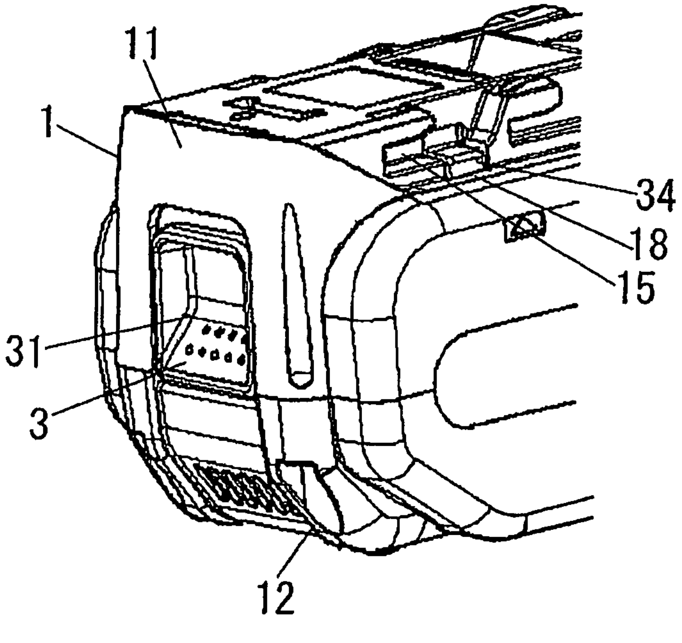

The lock pins 34 are provided at the left and right sides of the lock plate 3 and extend into the engagement grooves 15 through the openings 18 opened toward the engagement grooves 15 of the upper housing 11. When the lock plate 3 is biased into an upper position by the return spring 30, each of the lock pins 34 isolates the transverse introduction groove portion and the longitudinal groove portion of one of the engagement grooves 15 as shown in FIG. 3A. If the lock plate 3 is pressed down against the biasing force of the return spring 30, each of the lock pins 34 is retracted from the engagement grooves 15 as illustrated in FIG. 3B.

Figure 1A:
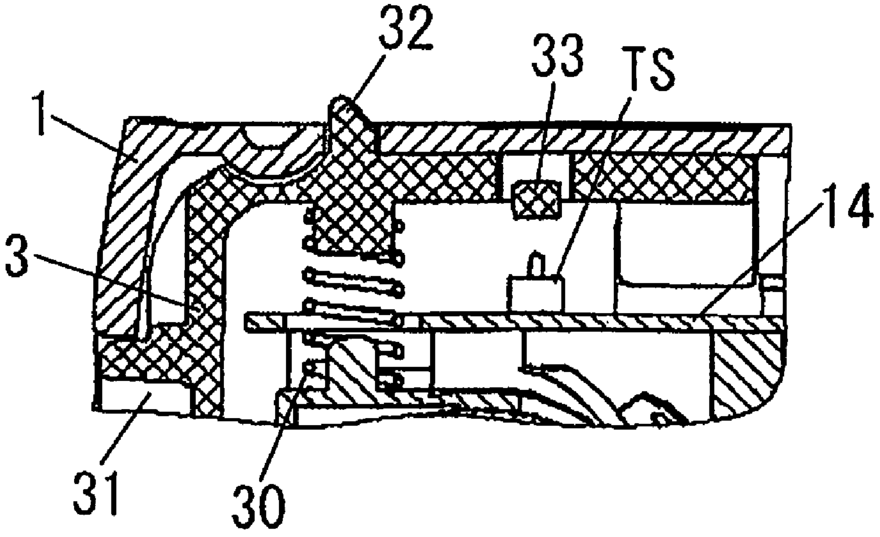
FIGS. 1A and 1B are section views illustrating the operation of major parts of an electric power tool in accordance with one embodiment of the present invention.
Figure 1B:
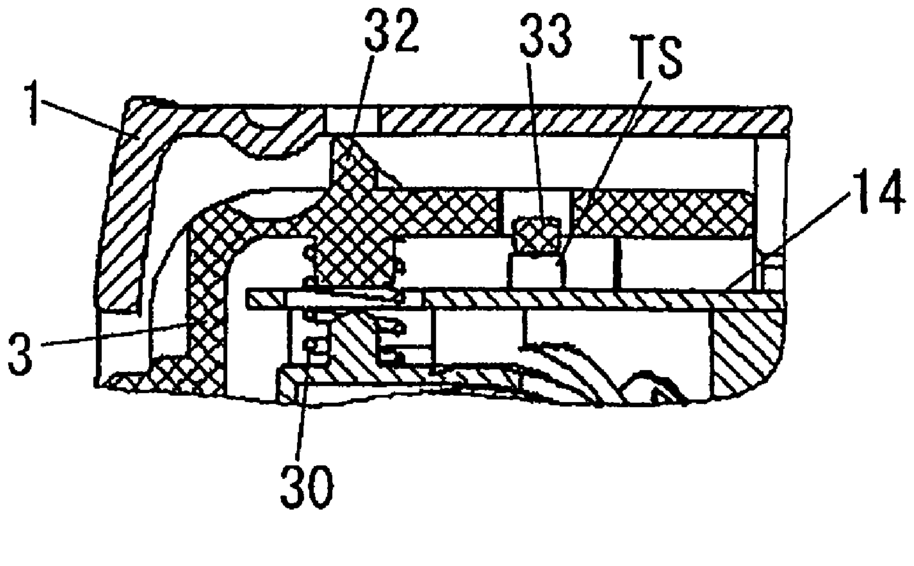

An interrupter switch TS is installed in the circuit board 14 of the battery pack 1. The interrupter switch TS is a normally opened tact switch. When the lock plate 3 is moved down against the biasing force of the return spring 30, the interrupter switch TS is pressed by a push button portion 33 of the lock plate 3 and is turned on as shown in FIG. 1B.

Figure 5:
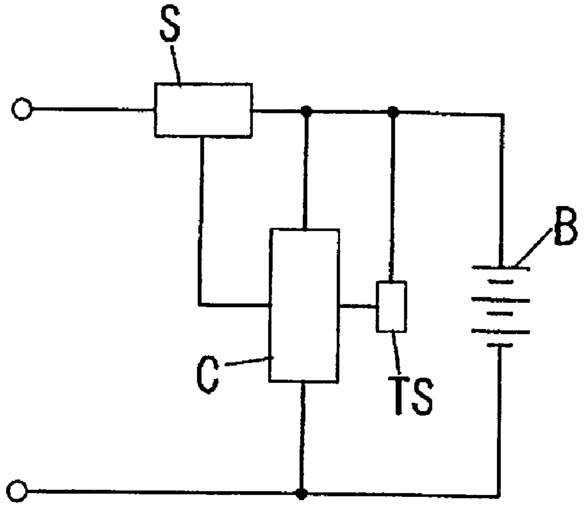
FIG. 5 is a schematic block diagram showing a circuit employed in the battery pack.

Referring to FIG. 5, the interrupter switch TS is connected to a control circuit C for controlling the opening and closing operation of a switch device S provided within the battery pack 1 and serially interposed between the battery cells B and the power source terminal group 16. The control circuit C closes the switch device S to allow the battery cells B to be electrically connected to the power source terminal group 16 when the interrupter switch TS is in an off-state and opens the switch device S to interrupt the electric connection between the battery cells B and the power source terminal group 16 when the interrupter switch TS is in an on-state.

In the course of mounting the battery pack 1 to the tool body 2, the connection protrusions 21 of the tool body 2 are positioned at the entrances of the transverse introduction groove portions of the engagement grooves 15. At this time, the lock plate 3 is biased into an upper position by the return spring 30, the lock pins 34 are kept in the state as illustrated in FIG. 3A, and the push button portion 3 lies in the state as shown in FIG. 1A. Therefore, the interrupter switch TS is turned off. At this moment, the terminal groups 16 and 17 do not make contact with the corresponding terminal groups of the tool body 2. Thus the electric power tool is not operated even if a user operates a switch 27 of the tool body 2.

Figure 4A:
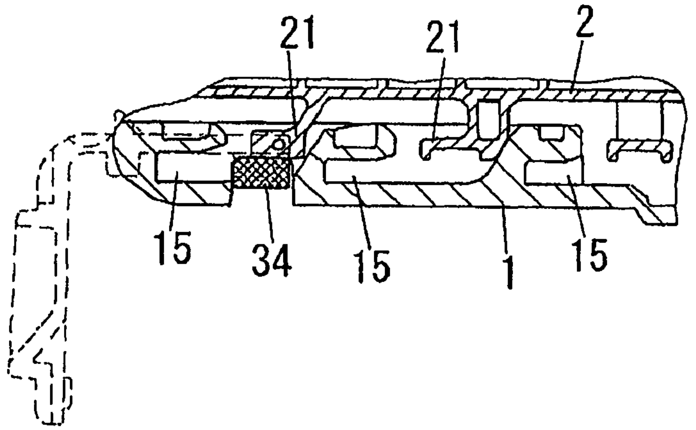
FIGS. 4A, 4B and 4C are section views showing the states of a connection portion between the battery pack and the tool body.
Figure 4B:
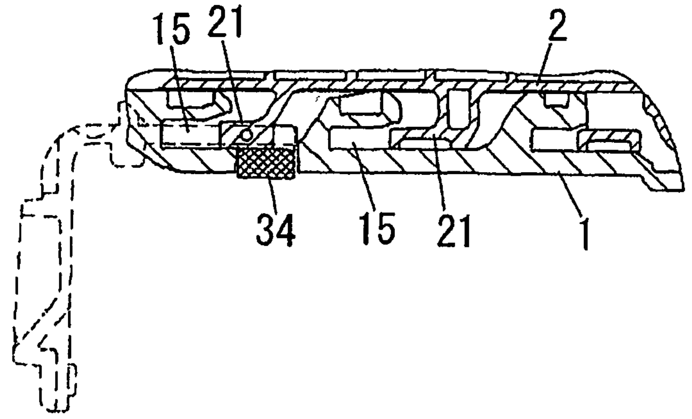

When the connection protrusions 21 reach the lower ends of the transverse introduction groove portions joining to the longitudinal groove portions of the engagement grooves 15 as illustrated in FIG. 4B, the projection portion 32 protruding toward the upper surface of the battery pack 1 is pressed by the tool body 2 and, then, the lock pins 34 are pressed by the connection protrusions 21. As a result, the lock plate 3 is moved downwards against the biasing force of the return spring 30, thereby turning on the interrupter switch TS as shown in FIG. 1B.

In this state, the terminal groups 16 and 17 of the battery pack 1 remain in contact with the corresponding terminal groups of the tool body 2, but the control circuit C keeps the switch device S in an off-state. For that reason, no electric current is supplied to the tool body 2. Therefore, the electric power tool is not operated even if a user operates the switch 27 of the tool body 2.

Figure 4C:
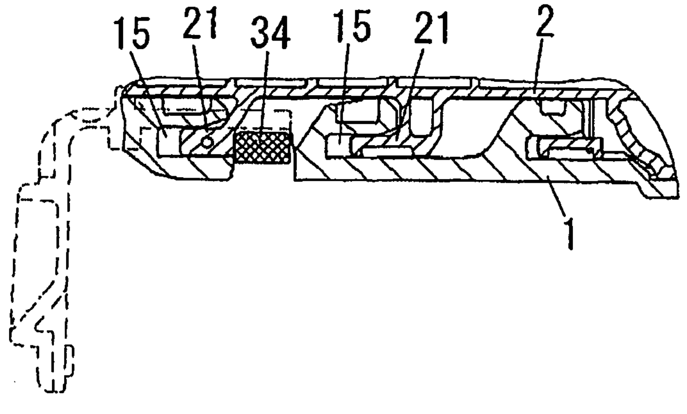

Under the state mentioned above, the battery pack 1 is slid backwards relative to the tool body 2. Thus the connection protrusions 21 are completely inserted into the longitudinal groove portions of the engagement grooves 15 as illustrated in FIG. 4C, thereby coupling the battery pack 1 and the tool body 2 together. At this time, the lock plate 3 is returned to the state shown in FIG. 1A under the biasing force of the return spring 30, and the interrupter switch TS is turned off. Therefore, the switch device S is turned on to start supplying an electric current from the battery pack 1 to the tool body 2. Thus the electric power tool becomes operable by the operation of the switch 27 of the tool body 2.

At this time, the lock pins 34 of the lock plate 3 are penetrated into the engagement grooves 15 as is apparent in FIG. 4C. This establishes a connection-keeping state (a locked state) in which the connection protrusions 21 are prevented from coming back to the transverse introduction groove portions of the engagement grooves 15, i.e., in which the battery pack 1 is prevented from dropping from the tool body 2. Therefore, the battery pack 1 is not dropped even if vibration is transferred thereto during the process of using the electric power tool.

In order to remove the battery pack 1 from the tool body 2, the lock plate 3 is moved downwards against the biasing force of the return spring 30 by pressing the operation portion 31 of the lock plate 3 with a finger. As a consequence, the lock pins 34 are retracted from the engagement grooves 15. If the battery pack 1 is slid forwards relative to the tool body 2 in this state, the connection protrusions 21 are caused to move from the longitudinal groove portions of the engagement grooves 15 to the transverse introduction groove portions thereof. This makes it possible for a user to pull down the battery pack 1 out of the tool body 2.

At the moment when the lock plate 3 is moved down by pressing the operation portion 31 thereof, the terminal groups 16 and 17 of the battery pack 1 are connected to the corresponding terminal groups of the tool body 2. Even if a user inadvertently operates the switch 27 of the tool body 2 at this time, there is no possibility that the tool body 2 comes into operation. This is because the interrupter switch TS is turned on to keep the switch device S in an off-state.

Figure 6:
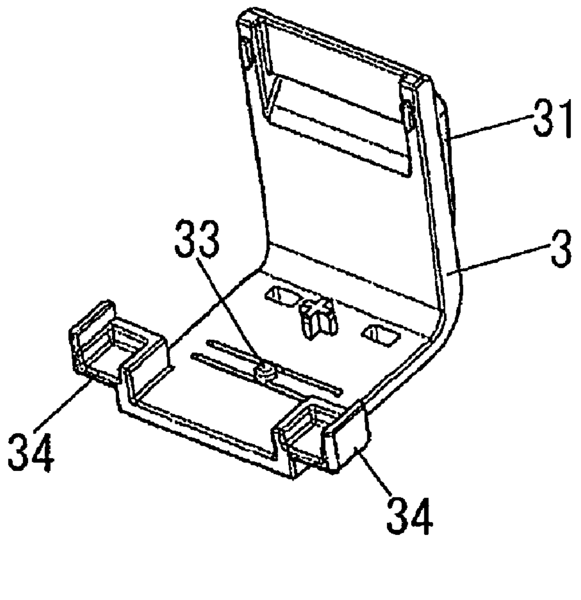
FIG. 6 is a perspective view showing a modified example of the lock plate.
Figure 7A:
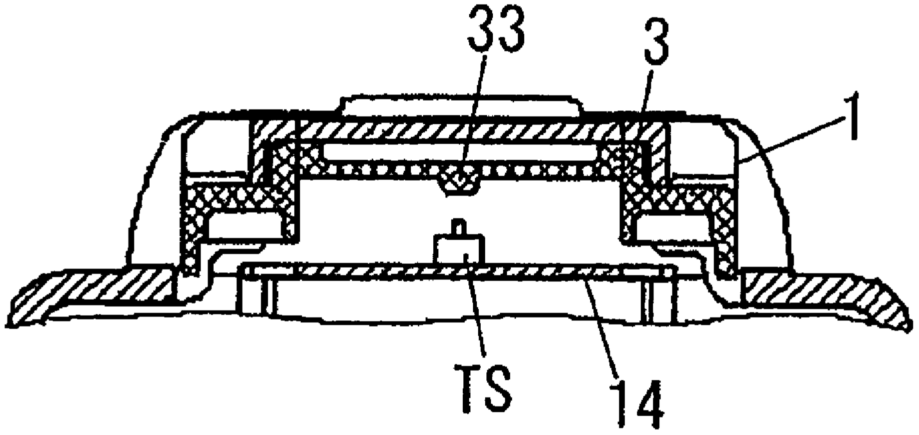
FIGS. 7A and 7B are section views of major parts illustrating the operation of the lock plate shown in FIG. 6.
Figure 7B:
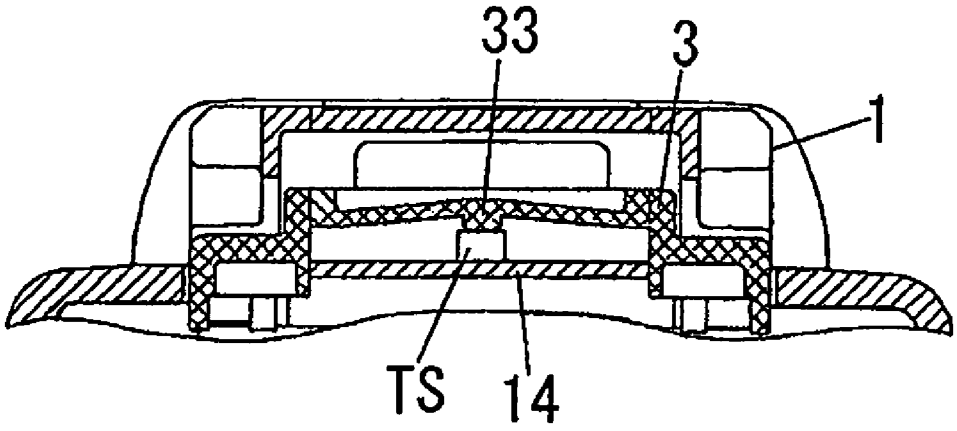

FIGS. 6, 7A and 7B show a modified example of the lock plate. In this modified example, the push button portion 33 provided in the lock plate 3 to operate the interrupter switch TS is made of an elastic material. The push button portion 33 is flexed when it presses the interrupter switch TS to turn on the same and consequently to turn off the switch device S. Thus the positional deviation between the push button portion 33 and the interrupter switch TS in the stroke direction of the interrupter switch TS is absorbed by the elasticity of the push button portion 33. In addition, the elasticity of the push button portion 33 serves to reduce the pressing force of the interrupter switch TS.

Figure 8A:
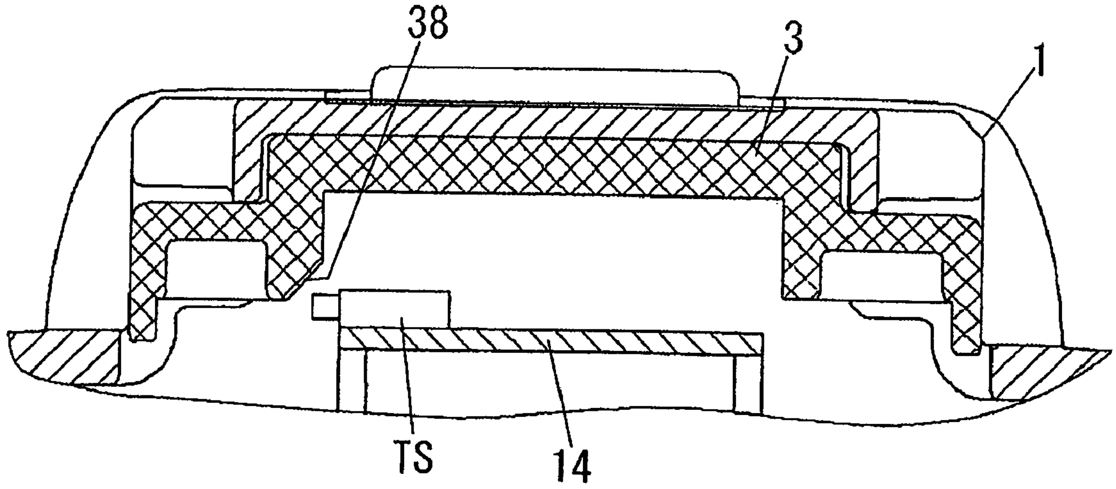
FIGS. 8A and 8B are section views of major parts illustrating the operation of another modified example of the lock plate.
Figure 8B:
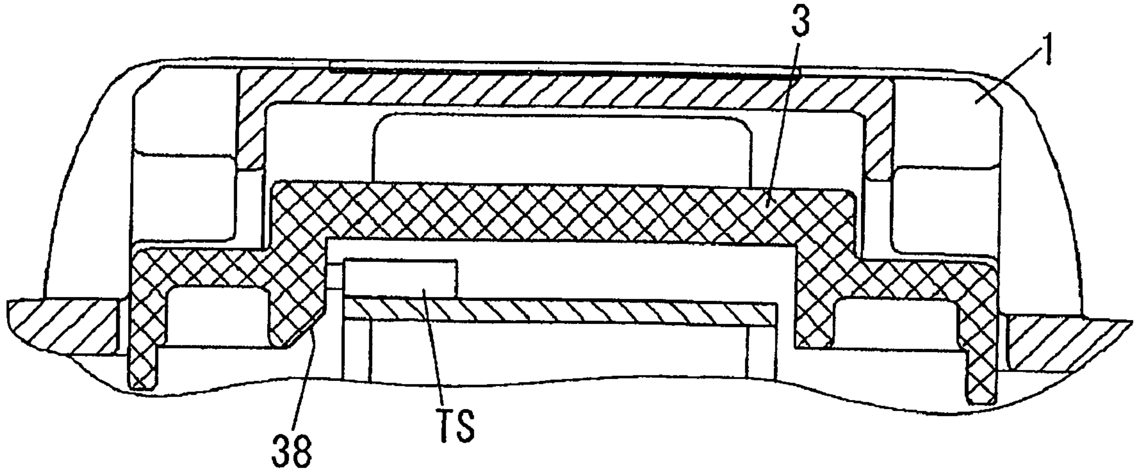

FIGS. 8A and 8B show another modified example of the lock plate. In this modified example, the interrupter switch TS is arranged such that the stroke direction thereof makes a right angle with the operating direction of the lock plate 3. The lock plate 3 has a slanting surface portion 38. When the battery pack 1 is mounted to or removed from the tool body 2, the slanting surface portion 38 of the lock plate 3 presses or releases the interrupter switch TS to turn on or off the same.

In this case, it is possible to secure the over-travel amount of the interrupter switch TS regardless of the positional deviation between the lock plate 3 and the interrupter switch TS in the stroke direction of the interrupter switch TS.

While the invention has been shown and described with respect to the embodiments, it will be understood by those skilled in the art that various changes and modification may be made without departing from the scope of the invention as defined in the following claims.

What is claimed is:

1. An electric power tool comprising:

a tool body;

a battery pack removably mounted to the tool body and provided with a battery cell and a power source terminal group, the battery pack being used as a power source of the tool body;

a lock unit for keeping the battery pack mounted to the tool body; and an interrupter switch which makes an electrical connection between the power source terminal group and the battery cell of the battery pack when the battery pack is completely mounted to the tool body or the battery pack is completely separated from the tool body, the interrupter switch interrupting the electrical connection when the battery pack makes contact with the tool body but is not completely mounted to the tool body.

2. The electric power tool of claim 1, wherein the interrupter switch is turned on and off in response to the operation of the lock unit.

3. The electric power tool of claim 2, wherein the lock unit includes a push button portion for operating the interrupter switch, the push button portion being made of an elastic material.

4. The electric power tool of claim 2, wherein the interrupter switch is arranged to have a stroke direction perpendicular to the operating direction of the lock unit.

5. The electric power tool of claim 4, wherein the interrupter switch is configured to be turned off when the lock unit keeps the battery pack completely mounted to the tool body.

6. The electric power tool of claim 1, wherein the interrupter switch is designed for use in turning on and off a circuit control signal.

7. The electric power tool of claim 1, wherein the lock unit and the interrupter switch are provided in the battery pack.

8. The electric power tool of claim 1, wherein the interrupter switch interrupts the electrical connection when the lock unit is pushed by one of the battery pack and the tool body.

* * * * *